Patented Nov. 11, 1947

2,430,520

UNITED STATES PATENT OFFICE 2,430,520

DEPOSITION OF METAL ON GLASS FROM METAL FORMATES

Evelyn C. Marboe, State College, Pa., assignor to Glass Science, Incorporated, New York, N. Y., a corporation of New York No Drawing. Application March 6, 1945, Serial No. 581,331

2 Claims. (Cl. 117—35)

This invention relates to improvements in glass manufacture and more particularly to the deposition of metals on glass to form adherent metal deposits.

According to the present invention adherent metal deposits are formed on glass by volatilizing a suitable metallo-organic compound in vacuo and decomposing the vapor of that compound at a hot glass surface. Under these conditions a continuous film of metal can be deposited and the film shows good adherence. By heating the glass surface in vacuo it is freed from adsorbed water and other gases and vapors and brought into a state of increased reactivity. By bringing the vapors of the metallo-organic compound into contact with the hot activated glass surface, reaction occurs with the formation or deposit of a continuous, adherent film of metal.

It is known that metals such as copper, nickel and platinum form complexes and salts with organic acids and similar compounds which decompose at higher temperatures to form free metal. Heating of such a compound in an open vessel usually results in the decomposition of the compound to form gases, tarry products and the metal in a normally spongy form. It has been observed that copper formate will decompose on glass to form mirror patches but without good adherence and without the formation of a continuous mirror.

I have found, however, that where the hot glass surface is activated by heating under a vacuum to a temperature of around 350 to 450° C. and the vapors of a suitable metallo-organic compound, vaporized or volatilized in vacuo, are brought into contact with such an activated surface, the vapor of the organic compound appears to decompose immediately upon striking the hot glass surface and the metal appears to react therewith to give a metal deposit in the form of an adherent film. The superior properties of this film appear to be due to the freeing of the glass surface from adsorbed gases and vapors and to the setting free or reaction of the metal in an atomic state such that it reacts with or is held by the valences or residual valences of the glass surface and builds up an adherent film.

The metallo-organic compounds used in the process are those which vaporize without decomposition in vacuo and decompose in contact with the hot activated glass surface to form an adherent metal deposit. For producing a copper mirror copper formate is advantageously used; but other copper compounds which contain organic radicals, such as copper acetate and which can be volatilized in vacuo without decomposition, can also be used. Other suitable compounds are the acetylacetonates, for example, of copper, nickel and platinum. These metallo-organic compounds have the metal joined to the organic radical through an oxygen linkage and can be readily volatilized in vacuo at a temperature below that of decomposition and will undergo decomposition or reaction to form adherent metal layers or films when brought into contact with the hot activated glass surfaces.

The process of the present invention enables metal mirrors with good adherence to the glass surface to be produced as well as the formation of adherent metal deposits to which added layers of metal may be added, e. g., by galvanic metal deposition.

In carrying out the process provision will be made for volatilizing the metallo-organic compound in vacuo, for heating the glass surface in vacuo to activate it and to maintain it at a temperature at which the metallo-organic compound will decompose or react. The heating of the glass article or surface, e. g., to a temperature of 350 to 450° C. can be effected in various ways, for example, by radiant heat. Radiant heat from the hot glass surface or from other source may also be relied upon to vaporize the metallo-organic compound in vacuo; or other suitable heating means can be employed to volatilize such compound. The volatilized metallo-organic compound is brought in vapor form in contact with the hot activated glass surface where apparently the compound is decomposed and the metal set free in an atomic state such that it will react with or will be held by the valences or secondary valences of the hot activated glass surface.

By continuation or prolongation of the process the layer of metal can be increased, thus making it possible to form metal surfaces or mirrors of varying thickness on the glass surface.

The invention will be illustrated by the following specific examples but it will be understood that the invention is not limited thereto.

*Example I.*—A glass object to be provided with a metal surface is heated to a temperature of 350–450° C. in a chamber provided with means for maintaining it under a high vacuum. Copper formate is placed in the same chamber and is heated to bring about its volatilization which takes place at a temperature of around 170 to 180° C. The vapors of the copper formate come in contact with the hot activated surface of the glass object and decompose or react immediately upon striking the hot glass surface, and the metal deposits at the hot glass surface forming an adherent film. The superior properties of the film appear to be due, as above explained, to the freeing of the glass surface from adsorbed gases and vapors, and to the copper being set free in an atomic and very reactive state. The low concentration of the atomic copper under such conditions allows the copper atoms to be held by the valences or residual valences of the glass surface and to build up an adherent film. In contact with the hot glass surface the copper formate apparently undergoes simple decomposition which leads practically quantitatively to carbon dioxide, hydrogen and metallic copper as indicated by the following equation:

$$Cu(HCOO)_2 \rightarrow 2CO_2 + H_2 + Cu$$

As a result the copper appears to be set free at the hot activated glass surface in a form well adapted for reaction therewith to form an adherent metal layer thereon which can be further built up by further deposits of copper to a film of the desired thickness, e. g., for use as a mirror.

*Example II.* A platinum mirror may be produced in a similar manner by decomposing platinous acetylacetonate under suitable conditions. This compound can be prepared according to the method described by Werner (Ber., 34 (1901), pp. 2592-2593). Thus it may be produced by dissolving 1 part of platinous potassium chloride in 8 parts of hot water and mixing with a solution of 3 parts (1:3) of potassium hydroxide and heating until yellow. Acetylacetone (2 parts) is added and the mixture is heated and stirred constantly for a short time, e. g., approximately fifteen minutes. A fine yellow powder forms and is collected by filtration. An increased yield may be obtained by adding additional potassium hydroxide (1 part) and acetylacetone (1 part) to the filtrate and heating again; and with repetition of this process. The yellow powder is washed well with water and dried.

The platinous acetylacetonate volatilizes in vacuo at about 180° C. and its vapor decomposes at higher temperatures, around 350-450° C. By passing vapors in contact with a hot activated glass surface maintained in vacuo at a temperature of around 350-450° C. decomposition takes place at the hot glass surface with the formation of a metallic film showing good adherence properties.

Other metal acetylacetonates may similarly be used, for example, copper and nickel acetylacetonates, to form metal deposits of other metals on glass.

Copper acetylacetonate (Morgan and Moss, J. C. S., 105 (1914), pp. 189-201) may be prepared by shaking or agitating together a water-alcohol solution of cupric chloride, sodium acetate and acetylacetone. The pale blue powder formed is filtered and washed well with water and dried. The cupric acetylacetonate volatilizes in vacuo at about 250° C. and its vapor decomposes at higher temperatures in contact with a hot activated glass surface, e. g., heated to 350-450° C. to form a copper mirror on the hot glass surface.

Nickel acetylacetonate (Gach, Monatshefte, 21 (1900), p. 103) may be prepared by the following process:

Green nickel hydroxide is precipitated from nickel nitrate with sodium hydroxide. The precipitate is well washed with water and the wet nickel hydroxide (1 mole) is then shaken or agitated with acetylacetone (2 moles). A blue-green powdery precipitate of nickel acetylacetonate separates almost quantitatively and may be recrystallized from ethyl alcohol. The nickel acetylacetonate volatilizes in vacuo at about 160° C. and its vapor decomposes at a hot activated glass surface at a temperature of around 350-450° C., forming an adherent nickel mirror.

Instead of forming adherent metal coatings and mirrors of individual metals, a modified or composite coating can be produced by using volatile organic compounds of a plurality of metals. Thus cupric formate may be combined with volatile organic compounds of other metals to form a modified mirror. A dry mixture of cupric formate, calcium formate and stannous chloride, for example, will give a bronze mirror coating.

It will thus be seen that the present invention provides an improved method of making adherent metal coatings on glass by the use of metallo-organic compounds vaporizable in vacuo and by bringing the vapors of such compounds in contact with hot activated glass surfaces which cause decomposition of the metallo-organic compound and the formation of adherent metal surfaces; and that in this way glass may be provided with a metal mirror capable of being polished or a metal surface on which metal may be deposited by galvanic or other processes. It will further be seen that the glass surface is activated by subjecting it to a high temperature in vacuo and that the vapors of the metallo-organic compound, vaporizable in vacuo at a temperature below decomposition, are brought into contact with the hot activated glass surface at a sufficiently high temperature to bring about decomposition and the formation of an adherent metal deposit on the glass surface.

I claim:

1. The method of forming adherent metal deposits on glass which comprises volatilizing a metal formate in vacuo and causing the vapors to come into contact with hot glass surfaces in vacuo heated to a sufficiently high temperature to effect decomposition of the formate and form an adherent metal deposit on the glass surface.

2. The method of forming an adherent copper surface on glass which comprises heating glass surfaces to a temperature around 350-450° C. in vacuo, vaporizing copper formate in vacuo, at a temperature below that of decomposition, and causing the copper formate vapors to come into contact with the hot glass surfaces to effect decomposition and the formation of an adherent copper layer thereon.

EVELYN C. MARBOE.

REFERENCES CITED

The following references are of record in the file of this patent:

UNITED STATES PATENTS

| Number | Name | Date |
|---|---|---|
| 1,090,456 | Darrah | Mar. 17, 1914 |
| 1,675,120 | Marden et al. | June 26, 1928 |
| 1,816,476 | Fink et al. | July 28, 1931 |
| 1,866,729 | Spanner | July 12, 1932 |